Patented Feb. 10, 1953

2,628,163

UNITED STATES PATENT OFFICE 2,628,163

HERBICIDAL COMPOSITIONS

David T. Mowry, Dayton, Ohio, and Norman R. Piesbergen, Collinsville, Ill., assignors to Monsanto Chemical Company, St. Louis, Mo., a corporation of Delaware No Drawing. Application March 22, 1951, Serial No. 217,061

11 Claims. (Cl. 71—2.7)

The present invention relates to herbicides and deals more particularly with methods for the general destruction of undesired plants.

A number of herbicides are known, a variety of organic and inorganic compounds having been suggested in the prior art for use as plant killers. Among disadvantages of prior herbicides may be mentioned water insolubility (and hence the necessity of flammable organic or obnoxious spray media), chemical reactivity with other compounds customarily employed in agricultural sprays and powders, instability when exposed for long periods of time to ordinary atmospheric conditions, etc.

Now we have found that highly stable, valuable herbicides are obtained by employing as the active ingredient a compound selected from the class consisting of mucochloric acid, mucobromic acid, and the alkali metal, alkaline earth metal, ammonium and organic amine salts of such acids. Examples of alkali metal salts useful for the present purpose include sodium, potassium or lithium mucochloride or mucobromide. Alkaline earth metal salts which may be employed are e. g., calcium, magnesium and barium mucochloride or mucobromide. As illustrative of organic amine salts possessing herbicidal activity may be mentioned the diamylamine, the dicyclohexylamine, the triethanolamine, the pyridine and the quinoline salts of mucochloric and mucobromic acids.

The present compounds are effective herbicides over wide ranges of concentrations. Their effectiveness may be measured either by spraying water solutions or oil-in-water emulsions of the chemicals on potted test plants or by dipping the potted plants in the solutions and observing the phytotoxic effects over a standard period of time. The general usefulness of a herbicide may be measured by comparing the concentrations of a herbicide required to produce a certain phytotoxic effect on a broad leafed plant with the concentrations of a herbicide required to produce the same effects on a narrow leafed plant. For evaluation in many laboratories the bean has been adopted as a typical broad-leafed dicotyledonous plant for technical reasons, and corn has been used as a standard narrow-leafed monocotyledonous plant.

The present invention is illustrated but not limited by the following examples:

Example 1

The herbicidal activity of mucochloric acid was demonstrated as follows:

Emulsions of mucochloric acid were prepared, using cyclohexanone as solvent and as an emulsifier a mixture consisting of 65% of a surface-active agent known to the trade as "Sterox CD" and 35% of a surface-active agent known to the trade as "Santomerse 43."

Mucochloric acid was used in two different concentrations. Emulsion I contained one part of the acid per 100 parts of solvent and Emulsion II contained 1 part of the acid per 315 parts of the solvent.

Potted plants of string bean and corn were treated with each of the above emulsions, the beans being treated when the second leaves were well developed and the corn when 9 to 12 inches high. Treatment was effected by spraying the plants with the emulsions, draining off excess emulsion, and maintaining the pots in a greenhouse for a period of two weeks. Observation of the plants at the end of that time showed that with the higher mucochloric concentration corn plants were totally dead and with the lower concentration there was severe injury to the corn plants with most of the leaves dead. Substantially the same effect was evidenced with the bean plants.

Example 2

The herbicidal activity of mucobromic acid was tested employing the procedure described above. At the higher mucobromic acid concentrations both the bean and the corn plants showed severe injury; whereas at the lower concentrations there was evidenced only slight damage to the foliage.

Good herbicidal activity is also possessed by mucobromic acid or salts of mucobromic or mucochloric acid such as sodium mucochloride, magnesium mucobromide, the pyridine salt of mucobromic acid, the triethanolamine salt of mucobromic acid, etc.

Herbicidal compositions containing the present compounds may be water solutions or oil-in-water emulsions of the compounds. The solutions may be obtained simply by dissolving them in water in effective proportions.

Dispersing or emulsifying agents are advantageously employed in the preparation of the present herbicidal suspensions or emulsions.

The mucochloric or mucobromic acid or the salts thereof are preferably applied by spraying aqueous suspensions or oil emulsions of the same, this method affording an easy and inexpensive way of destroying plant growth. However, they are likewise effective when applied in agricultural dusts; or they may be used with water-insoluble insecticides, fungicides, etc. in customarily employed organic solutions.

Because of the high herbicidal activity of the present acids and their salts, they are advantageously applied by mixing them with inert ingredients as carriers. Valuable herbicidal compositions are prepared by incorporating small amounts of the present acids into such carriers as water, hydrocarbon oils, organic solvents of the acids, dusts such as bentonite, pumice etc. Sprays may also be prepared by dissolving the mucobromic acid in oils or inorganic solvents to make concentrates and then adding small amounts of the concentrates to water, advantageously in the presence of an emulsifying or dispersing agent. Emulsions and dispersions thus prepared have the property of adhering to the plant foliage for a long period of time.

The aqueous solutions or oil-in-water emulsions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as liquid sprays or dusts or they may be admixed with customarily employed temporary surfacing materials, e. g., oils, cinders, etc. The present invention thus provides a generally useful method of preventing and destroying undesirable plant growth.

What we claim is:

1. A herbicidal composition comprising an oil-in-water emulsion of a compound selected from the class consisting of mucochloric acid, mucobromic acid, and the alkali metal, alkaline earth metal, ammonium and organic amine salts of said acids.

2. A herbicidal composition comprising an oil-in-water emulsion of mucochloric acid.

3. A herbicidal composition comprising an oil-in-water emulsion of mucobromic acid.

4. The method of destroying undesirable plants which comprises treating said plants with a toxic quantity of a herbicidal composition containing a compound selected from the class consisting of mucochloric acid, mucobromic acid, and the alkali metal, alkaline earth metal, ammonium and organic amine salts of said acid.

5. The method of destroying undesirable plants which comprises applying a toxic quantity of mucochloric acid to said plants.

6. The method of destroying undesirable plants which comprises applying a toxic quantity of mucobromic acid to said plants.

7. The method of destroying undesirable plants which comprises applying to said plants a toxic quantity of a herbicidal composition containing a carrier as an inert ingredient and, as the active ingredient, a compound selected from the class consisting of mucochloric acid, mucobromic acid, alkali metal, alkaline earth metal, ammonium and organic amine salts of said acid.

8. The method of destroying undesirable plants which comprises applying to said plants a toxic quantity of a herbicidal composition containing a carrier as an inert ingredient and mucochloric acid as the active ingredient.

9. The method of destroying undesirable plants which comprises applying to said plants a toxic quantity of a herbicidal composition containing a carrier as an inert ingredient and mucobromic acid as the active ingredient.

10. The method of destroying undesirable plants which comprises applying to said plants a toxic quantity of an oil-in-water emulsion of mucochloric acid.

11. The method of destroying undesirable plants which comprises applying to said plants a toxic quantity of an oil-in-water emulsion of mucobromic acid.

DAVID T. MOWRY.
NORMAN R. PIESBERGEN.

REFERENCES CITED

The following references are of record in the file of this patent:

Beilsteins Handbuch der Organischen Chemie, 4th edition (1921) Vol. 3, pp. 727 to 729.